United States Patent [19]

Opperthauser

[11] Patent Number: 5,058,730
[45] Date of Patent: Oct. 22, 1991

[54] AUTOMATIC DUMP ACTUATOR CONVEYOR SYSTEM

[75] Inventor: Keith G. Opperthauser, Linden, Mich.

[73] Assignee: Automated Systems, Inc., Pontiac, Mich.

[21] Appl. No.: 562,583

[22] Filed: Aug. 3, 1990

Related U.S. Application Data

[62] Division of Ser. No. 230,497, Aug. 10, 1988, Pat. No. 4,960,201.

[51] Int. Cl.$^5$ .............................................. B65G 19/26
[52] U.S. Cl. .................. 198/732; 198/861.2; 198/735.6
[58] Field of Search ............... 198/861.2, 465.3, 466.1, 198/721, 725, 728, 732, 735.6, 735.1, 817, 831, 861.1, 584, 587

[56] References Cited

U.S. PATENT DOCUMENTS

| | | | |
|---|---|---|---|
| 1,896,407 | 2/1933 | Hoeffleur | 198/836 X |
| 1,929,707 | 10/1933 | Mojonnier | 198/836 |
| 2,828,851 | 4/1958 | Thomas | 198/735.6 X |
| 2,990,941 | 7/1961 | Peras | 198/732 X |
| 3,812,955 | 5/1974 | Kopp | 198/732 |
| 4,144,965 | 3/1979 | Allredge et al. | 198/861.2 |
| 4,417,653 | 11/1983 | Zwezerynen | 198/732 X |
| 4,751,999 | 6/1988 | Opperthauser | 198/778 |

FOREIGN PATENT DOCUMENTS

| | | | |
|---|---|---|---|
| 2418249 | 10/1975 | Fed. Rep. of Germany | 198/732 |
| 6602114 | 9/1966 | Netherlands | 198/732 |
| 0542693 | 2/1977 | U.S.S.R. | 198/732 |

Primary Examiner—Robert P. Olszewski
Assistant Examiner—Cheryl L. Gastineau
Attorney, Agent, or Firm—Harness, Dickey & Pierce

[57] ABSTRACT

A conveyor system enabling dumping of workpieces is disclosed. The conveyor system is comprised of a mechanism for transporting workpieces along the conveyor system. The transporting mechanism has a first receiving end and a second removal or holding end. An endless belt mechanism is coupled with the transport mechanism in a spaced relationship. A driver is coupled with the endless belt in a spaced relationship with the transport mechanism to drive workpieces along the transport mechanism. A mechanism is coupled with the transport mechanism and belt mechanism to enable movement of the removing or holding end of the conveyor system with respect to the receiving end such that the conveyor may be used to feed more than one installation.

10 Claims, 4 Drawing Sheets

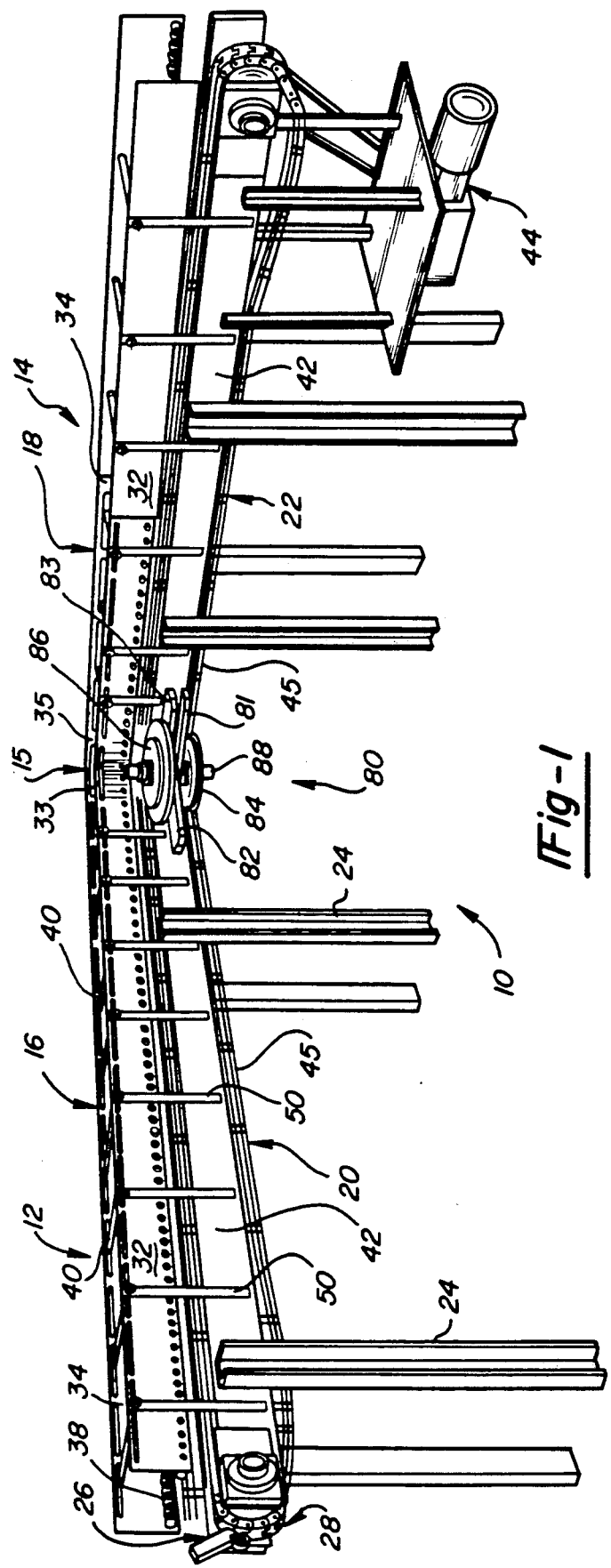

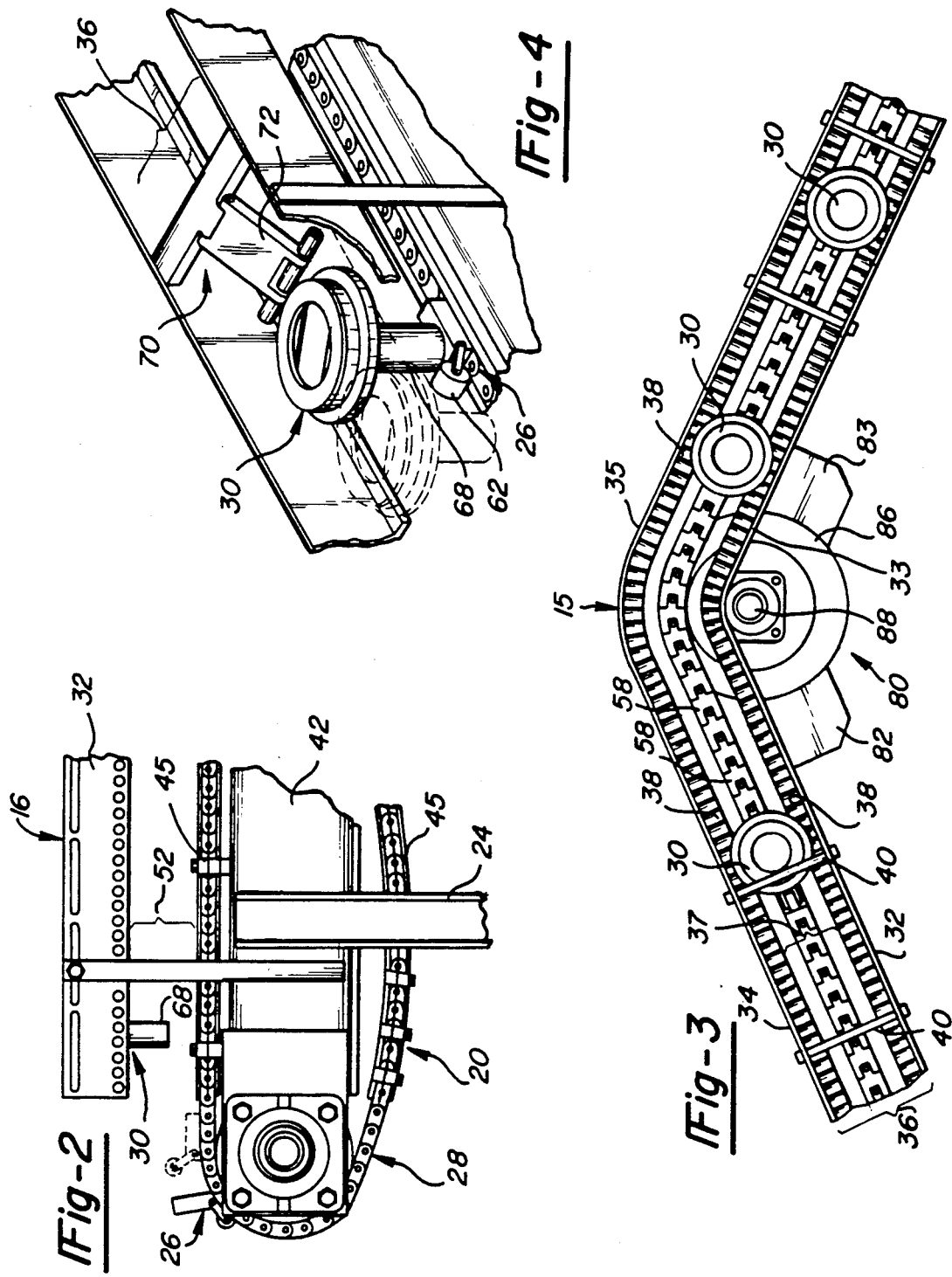

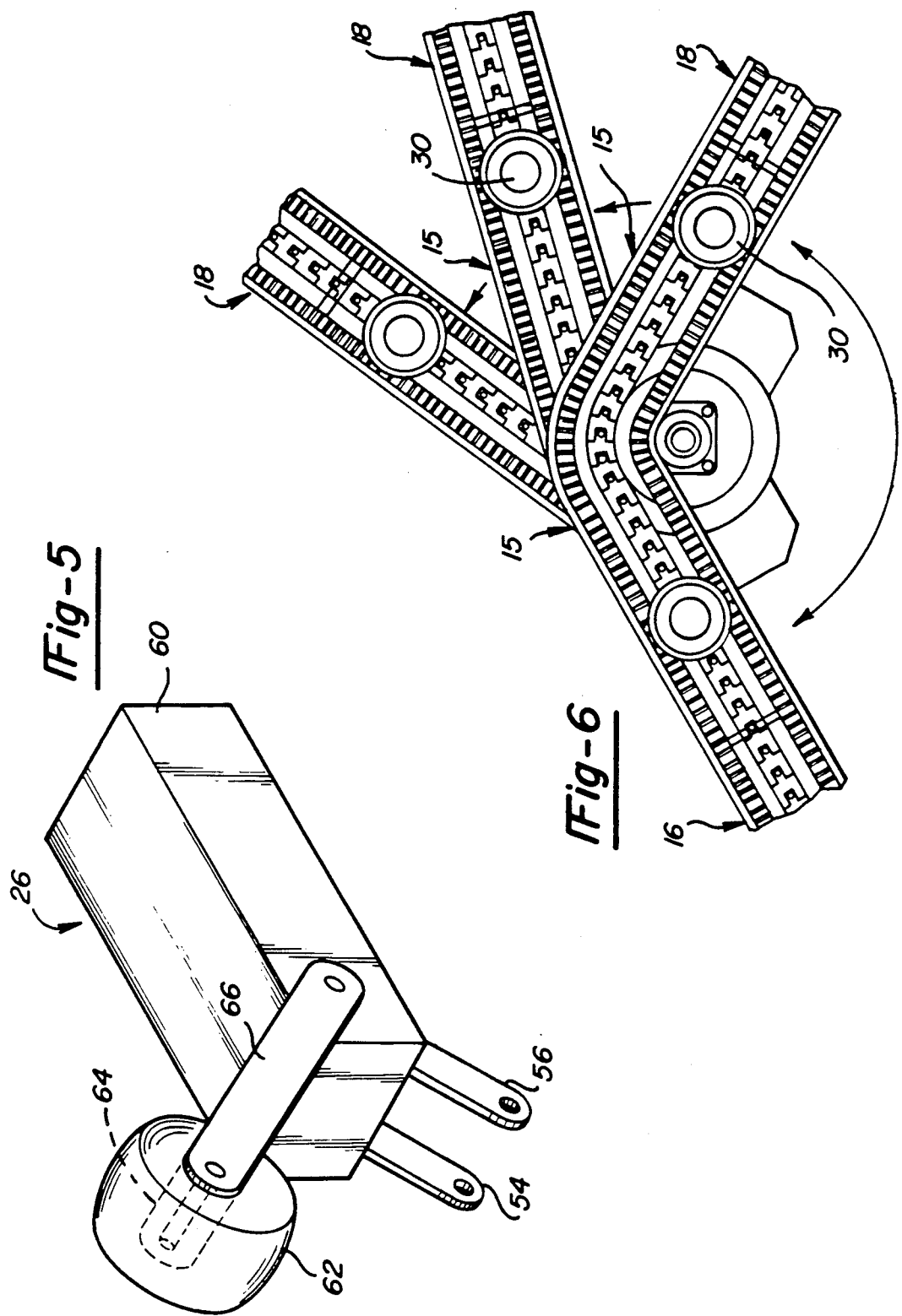

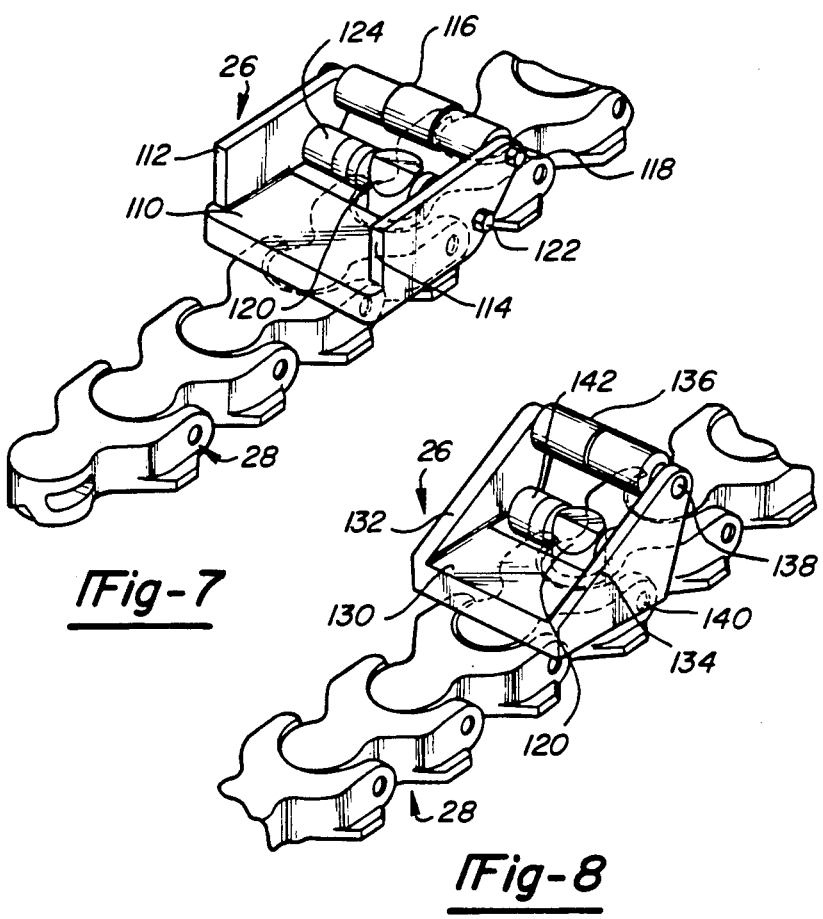
_Fig-7_
_Fig-8_
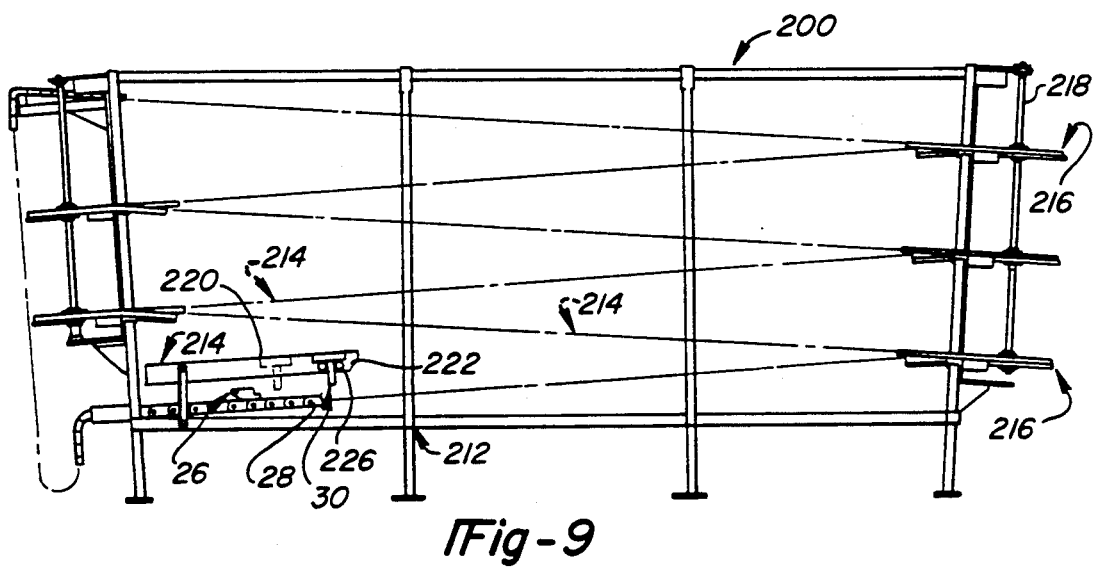
_Fig-9_

1

AUTOMATIC DUMP ACTUATOR CONVEYOR SYSTEM

This is a division of U.S. patent application Ser. No. 07/230,497, filed Aug. 10, 1988 entitled "Automatic Dump Actuator Conveyor System", U.S. Pat. No. 4,960,200.

BACKGROUND AND SUMMARY OF THE INVENTION

The present invention relates to conveyor systems and, more particularly, to dump-type conveyor systems having driver members attached to an endless belt to move workpieces along a workpiece transporting table. The invention further provides a pivotal movement of conveyor sections such that one end of the conveyor is movable with respect to the other end of the conveyor.

In the conveyor field, there is a difficulty with moving workpieces that have a radially extending base with an elongated axial projection such as some gear configurations. Generally, the workpieces are positioned on a conveyor such that they are resting on their base with the projection extending vertically upward. For some workpiece configurations, this positioning makes them unstable and susceptible to tipping, which particularly becomes a problem if the parts become stacked at the end of the conveyor. Accordingly, there is a need in the field to provide an improved conveyor system to handle workpieces of the configuration discussed above.

The present invention provides a conveyor system that conveniently handles workpieces having elongated projecting portions with a radially extending base. The present invention enables such workpieces to be positioned on the conveyor with the radially extending base supported by bearing elements with the projecting portion oriented downwardly. Due to this manner of supporting the workpiece, the present invention enables such workpieces to be stacked at the end of the conveyor during holding while reducing the tendency of the workpieces to tip. Further, the present invention provides the art with a sectional conveyor system which enables the sections to be pivoted with respect to one another, making the conveyor adjustable and adaptable for various plant layouts.

The conveyor system according to this invention includes a workpiece transport mechanism to support the workpieces as they are moved along the conveyor system. The transport mechanism has a receiving end and a removal or holding end. An endless moving belt is positioned below a transport mechanism which supports the parts. A driver mechanism is coupled to the endless belt which acts o the downwardly extending projecting portion of the workpieces to drive them along the transport mechanism. Also, a hinging system couples sections of the workpiece transport mechanism and the endless conveyor belt to enable angular movement of conveyor sections.

From the subsequent detailed description and appended claims taken in conjunction with the accompanying drawings, other objects and advantages of the present invention will become apparent to those skilled in the art.

BRIEF DESCRIPTION OF THE DRAWINGS

FIG. 1 is a perspective view of a conveyor system in accordance with the present invention.

FIG. 2 is a partial elevation view of an end of the conveyor system in accordance with the present invention.

FIG. 3 is a top plan view between two sections of a conveyor system in accordance with the present invention.

FIG. 4 is a partial perspective view of a removal or holding end of a conveyor system in accordance with the present invention.

FIG. 5 is a perspective view of a driver in accordance with the present invention.

FIG. 6 is a top plan view similar to FIG. 3, illustrating the pivotal movement of the sections.

FIG. 7 is a perspective view of another driver in accordance with the present invention.

FIG. 8 is a perspective view of another driver in accordance with the present invention.

FIG. 9 is a side elevation view partially in cross-sections of another embodiment of the present invention.

DETAILED DESCRIPTION OF THE PREFERRED EMBODIMENT

Moving to the Figures, and particularly to FIG. 1, a conveyor system is illustrated and designated with the reference numeral 10. The conveyor system 10 includes a first conveying portion 12 and a second conveying portion 14. Generally, workpieces are placed onto the conveyor system at the first portion 12 and are removed from the conveying system at the end of the second portion 14. However, this could be reversed.

The conveyor sections 12 and 14 are comprised of workpiece transfer sections 16 and 18 coupled with endless belt support sections 20 and 22, all of which are positioned above the ground by legs 24. A number of driver mechanisms 26 are attached to the endless belt 28 for driving workpieces 30 along the workpiece transfer sections 16 and 18.

Turning to FIGS. 2 through 4, a better understanding of the present invention may be acquired. The transfer section mechanisms 16 and 18 are substantially the same, and the same reference numerals will be used to identify similar elements. The transfer mechanism sections 16 and 18 include a pair of wall members 32 and 34. The wall members 32 and 34 are positioned opposing one another such that a channel 36 is formed between them. A plurality of bearing rollers 38 are positioned on one of the longitudinal edges of both of the wall members 32 and 34, forming a channel 37 between opposing rollers 38. The rollers 38 enable the workpieces 30 to move smoothly along through both sections 16 and 18 of the transfer mechanism although slide bar devices would work with equal success. Struts 40 are positioned at the other longitudinal edge of the wall members 32 and 34 to maintain a consistent channel spacing between the opposing wall members 32 and 34 and rollers 38.

The transfer mechanism sections 16 and 18 are connected together by a flexible transfer section 15. The flexible transfer section 15 is continuous with the sections 16 and 18, however, the flexible transfer section 15 enables the sections 16 and 18 to be pivoted with respect to one another, as seen in FIGS. 3 and 6. The flexible transfer section 15 includes wall members 33 and 35 Which are similar to wall members 32 and 34 and are formed of a material such as so called "blue steel", which provides for the flexure of the transfer section 15 to accommodate pivoting of the transfer sections 16 and 18. Rollers 38 are positioned on one longitudinal edge of each of said wall 33 and 35 to enable workpieces 30 to move along the rollers from section 16 to section 18.

The endless belt support sections 20 and 22 are substantially identical, and similar elements will be identified with the same reference numeral. A frame 42 having legs 24 projecting therefrom enables the belt 28 to be moved along the conveyor system 10. A cage 45 is connected to the frame and surrounds the belt 28 to minimize lateral movement of the belt 28. The frame 42 may be hollow or solid depending upon the desires of the end user. Preferably, the frame 42 will be somewhat lightweight to enable movement of section 22 with respect to section 20. The belt 28 moves along the frame sections 42 in the cage 45 and is driven by a motor 44. The cage 45 is on both sides of the frame sections 42 to retain the belt 28 in close proximity with the frame sections 42. The belt 28 reverses directions via sprockets 46 and 48, as seen in FIG. 1. The belt 28, therefore, rides in cage 45 on both longitudinal sides of the frame 42.

Spacer bars 50 are welded or the like to the frame 42 and project upwards and are bolted or the like onto the wall members 32 and 34 of the transfer section 16 and 18. The spacer bars 50 spatially position the workpieces 30 a desired distance from the drivers 26 as they pass along the belt 28. The spacers 50 are located on both lateral sides of the frame 42. Preferably, the struts 40 are positioned through the wall members 32 and 34 and bolted to the spacers 50. A gap or channel 52 is formed between the transfer sections 16 and 18 and the frame sections 20 and 22 to enable the drivers 26 to pass between the transfer sections 16 and 18, and frame sections 20 and 22, as best seen in FIG. 2.

The driver 26, which engages workpieces 30 is best shown in FIG. 5 and includes a pair of pivot arms 54 and 56 for interconnecting the driver to chain 28. A counterbalance 60 is integrally formed with the arms 54 and 56. A bearing 62 is supported by support arms 64 and 66 at a desired angle and height away from and above the counterbalance 60 to contact the workpiece 30 as the drivers 26 pass by the workpieces 30, as seen in FIGS. 2 and 4.

FIGS. 7 and 8 illustrate other embodiments of the driver 26.

The driver 26 illustrated in FIG. 7 has an integral body with a counterweight portion 110 and a pair of side rails 112 and 114. The rails 112 and 114 are integrally formed with and extend substantially transverse to the counterbalance portion 110. An opening is formed between the rails 112 and 114 enabling rollers 116 to span between the rails 112 and 114. A bolt 118 or the like is positioned through the rollers 116 to secure the rollers 116 to the rails 112 and 114.

A post 120 projects from the chain 28. The post 120 enables the driver 26 to be secured to the chain 28. A bolt 122 is passed through an aperture in the post 120. Spacers 124 are positioned between the post 120 and the rails 112 and 114 to enable proper positioning of the driver 26 on the chain 28.

The driver in FIG. 8 is similar to the driver 26 of FIG. 7. The driver in FIG. 8 includes a body member having a counterbalance portion 130 and a pair of side rails 132 and 134. The side rails 132 and 134 are integrally formed with the counterbalance portion 130 and are angular. Rollers 136 are positioned between the side rails 132 and 134 to contact the workpieces. A pin 138 secures the rollers 136 to the side rails 132 and 134.

A second pin 140 is passed through the post 120 to enable securement of the driver onto the chain 28. Spacers 142 are positioned between the post 120 and the rails 132 and 134 to enable proper positioning of the driver on the chain 28. The chain 28 may include magnetic members or the like for magnetically or the like drawing the counterbalance portions of the drivers to the chain 28.

Preferably, a plurality of drivers 26 are spatially positioned on the chain 28 to drive workpieces 30 along the system 10, as best seen in FIGS. 3 and 4. Thus, as a driver bearing 62 comes in contact with the elongated portion 68 of the workpiece 30, the workpiece 30 is driven along the rollers 38 in the transfer sections 15, 16, and 18. As the workpiece 30 contacts the stop 70, the driver 26 pivots on pivot arms 54 and 56 and counterweight 60 moves upward enabling bearing 62 to pass underneath the elongated portion 68 of the workpiece 30 and to continue along with the belt 28. Once the driver 26 is passed the workpiece 30, the counterbalance 60 brings the driver back to an upright position. It should be noted that the drivers 26 will pass under the workpieces as described above at any time the workpiece becomes stopped or detained on the transfer sections.

The stop 70 is positioned between wall members 32 and 34 at the removal end of the conveyor system 10 at transfer section 18. The stop mechanism 70 includes a pivotable member 72 to contact the workpiece 30 to enable the workpieces 30 to be stacked in position along the conveyor and metered out at the desired rate. As the pivot member 72 is moved, the workpiece 30 passes to a position where it can be removed from the conveyor system 10. It should be noted that other stops and feeders known in the art would function satisfactorily.

As can be seen in FIG. 4, the workpieces abut one another at their flange 74 at the removal end of the conveyor. The flange to flange contact of the workpieces with the projecting portion 68 projecting through the roller channel 37 enable the workpieces to be "stacked" in a manner which substantially eliminates the tendency of the workpieces to tip. Thus, the workpieces may be stacked at the removal end of the conveyor and may be removed when needed without the operator being concerned with the workpieces tipping.

The conveyor system 10 includes hinge mechanism 80 at flexible transfer section 15 which enables relative angular movement of the sections 12 and 14 with respect to one another. The mechanism 80 includes arms 81, 82, and 83 coupled with the frame sections 42, which enable coupling of disk members 84 and 86 with the belt 28 at the pivot point of the system 10. Arms 81, 82, and 83 are welded to frames 42 of sections 20 and 22 such that arm 82 projects from frame section 20 between arm 81, and arm 83 projects from frame section 22 so that the arms 81, 82, and 83 mesh, enabling a shaft 88 to be passed therethrough to provide pivotal movement of one conveyor section 12 with respect to the other conveyor section 14.

The disks 84 and 86, attached to shaft 88, enable the belt 28 to ride thereon to continue travelling in the cage 45 on the frame sections 42. The disks 84 and 86 are substantially identical to those described in U.S. patent application Ser. No. 856,801, filed Apr. 28, 1986, now U.S. Pat. No. 4,751,999 entitled "Storage Conveyor System", assigned to the same assignee as the present invention, the specification of which is herein incorporated by reference. The disks 84 and 86 provide the belt 28 with continuous movement along the conveyor system 10.

Moving to FIG. 6, the pivoting of the sections 12 and 14 is shown. As section 14 is pivoted with respect to section 12, the arms 81 and 83 pivot with respect to arm 82 and enable the section 14 to be moved. Also, flexible transfer section 15 flexes to enable the pivoting. As sections 12 and 14 pivot, the belt 28 stays in constant contact on the turn disks 84 and 86 to provide continuous movement of the belt 28 in the conveyor system 10.

FIG. 9 illustrates another embodiment of the present invention. The present invention may be used as a storage-type conveyor to temporarily hold workpieces between work stations until the workpiece can be transported.

As seen in FIG. 9, the storage conveyor system 200 includes a frame 212, a plurality of inclined alternating direction tracks 214, turn disks 216 and at least one or more axles 218 for positioning the disk and the belt 28. The tracks 214 are substantially the same as those described herein having a pair of wall members 220 and 222 positioned opposing one another such that a channel is formed between them. A plurality of bearing rollers 226 are positioned on one of the longitudinal edges of both of the wall members forming a channel between the opposing rollers. The rollers enable the workpiece 30 to move smoothly along the inclined tracks 214.

As mentioned above, the drivers 26 carry the workpieces 30 along the incline tracks 214. The storage conveyor is similar to that disclosed in U.S. patent application Ser. No. 856,801, filed Apr. 28, 1986, now U.S. Pat. No. 4,751,999 assigned to the same assignee as the present invention, the specification of which is herein incorporated by reference, and includes modifications including the wall members 222 and 224 and the rollers 226 to carry the workpieces 30 as described herein.

While the above discloses the preferred embodiment of the present invention, it will be understood that modifications, variations and alterations may be made to the present invention without varying from the scope and fair meaning of the subjoined claims.

What is claimed is:

1. A conveyor system comprising:
  means for supporting workpieces along the conveyor system, said workpiece supporting means having two rigid sections joined together;
  means for driving workpieces along said workpiece transporting means, said driving means including an endless belt in a spaced relationship with said workpiece transporting means; and
  means coupled with said workpiece transporting means and said drive means for enabling angular movement of one of said rigid sections with respect to the other of said rigid sections, said movement means comprises members projecting from each of said rigid sections, said member meshing with one another, means for enabling movement of said endless belt for driving workpieces as said rigid sections of said conveyor are moved with respect to one another, and flexible means coupled with said rigid sections of said workpiece supporting means to enable said rigid sections to be moved with respect to one another, said flexible means including means for supporting the workpieces.

2. A conveyor system comprising:
  means for supporting workpieces along said conveyor system, said means having two rigid sections joining at their ends;
  endless moving belt means in a spaced relationship with said means for supporting workpieces;
  means coupled with said endless belt means in a spaced relationship with said workpiece supporting means for driving workpieces along said workpiece supporting means; and
  means coupled with said workpiece supporting means and endless belt means for enabling movement of one of said rigid sections with respect to the other of said rigid sections, said movement means comprises members projecting from each of said rigid sections, said member meshing with one another, means for enabling movement of said endless belt for driving workpieces as said rigid sections of said conveyor are moved with respect to one another, and flexible means coupled with said rigid sections of said workpiece transport means to enable said rigid sections to be moved with respect to one another, and flexible means including means supporting the workpieces.

3. The conveyor system according to claim 2 wherein said workpiece supporting means includes a pair of spaced opposing walls defining a channel, a plurality of rollers on each of said walls for enabling movement of said workpieces, and a gap between opposing rollers on said walls for enabling a portion of said workpieces to protrude between said opposing walls.

4. The conveyor system according to claim 2 further comprising means for spacing said workpiece supporting means a desired distance from said endless moving belt means forming a gap between said workpiece supporting means and said endless moving belt means for enabling said driving means to travel between said workpiece supporting means and said endless moving belt means.

5. The conveyor system according to claim 2 wherein said drive means includes one or more drivers, each driver comprised of means for pivotally securing said driver to said endless belt means, a bearing coupled with said pivot means for contacting workpieces to move said workpieces along said system, and counter balance means for maintaining said bearing in a first position adapted to contact with said workpiece and enabling said bearing to move to a second position out of contact with said workpiece when movement of said workpiece is stopped.

6. The conveyor system according to claim 3 wherein said means for supporting workpieces comprises two or more rigid channel defining sections for enabling transport of workpieces along said conveyor system.

7. The conveyor system according to claim 6 wherein said driving means includes two or more drive sections.

8. The conveyor system according to claim 7 wherein said means for enabling angular movement of the conveyor system is positioned between said two channel defining sections and said two drive sections.

9. The conveyor system according to claims 8 wherein said flexible means includes two flexible walls coupled with said two opposing walls of said workpiece supporting means to define a portion of the channel between the flexible walls to enable said conveyor ends to be moved with respect to one another, said flexible walls including a plurality of rollers on each of said flexible walls for supporting workpieces, and a gap between opposing rollers on said flexible opposing walls for enabling a portion of said workpieces to protrude between said flexible opposing walls.

10. A conveyor system for transporting workpieces having rigid sections which are relatively angularly pivotable comprising:

first and second conveyor sections having at least one pair of rows of bearing means for supporting said workpieces;

an endless belt travelling through both said conveyor sections;

driver means carried by said belt for engaging said workpieces for moving said workpieces along said conveyor sections;

means for enabling said first conveyor section to be pivoted with respect to said second conveyor section including, a first hinge member affixed to said first conveyor section, a second hinge member affixed to said second conveyor section, said hinge members overlapping, an axle passing through said first and second hinge members, disk means carried by said axle for supporting said belt whereby said conveyor sections are pivotable about said axle to enable angular pivoting of said sections.

* * * * *